United States Patent Office 3,158,586
Patented Nov. 24, 1964

3,158,586
SEALANT FROM AN ISOCYANATE-TERMINATED POLYOL, A DIGLYCIDYL POLYETHER, AND A POLYOL
Arthur H. Krause, Belmont, Mass., assignor, by mesne assignments, to United Shoe Machinery Corporation, Flemington, N.J., a corporation of New Jersey
No Drawing. Filed Mar. 14, 1960, Ser. No. 14,534
6 Claims. (Cl. 260—40)

This invention relates to a new sealant composition and particularly to a sealant composition for use in sealing joints between metal, glass, ceramic or concrete members in building constructions, aircraft and marine structures.

In the building industry an important development is the so-called "curtain wall" construction in which relatively large panels are secured to the building structure to provide a weather-resistant and decorative exterior. These panels may be of metal, glass, ceramic or concrete and because of their area and relatively light weight provide important economies in time, weight, and cost of construction. Because of their size, the problem of sealing joints between panels to make them weather tight is complicated by the relative movement of the edges of adjacent panels due to thermal expansion and contraction, and other factors.

Sealing joints in aircraft and marine structures presents the problem of securing the sealant in a manner permitting limited relative movement due to the sharp stresses encountered in operation of these structures. In these structures, because of the multiplicity of relatively fine joints to be sealed, there is the additional problem of providing a relatively long "pot life" for maintaining a consistency in the sealant composition which will enter and remain in place in the joints over the relatively long periods required to use up a batch of the sealing composition.

Sealant compositions based on liquid polysulfide polymers to which is added paste of fine solid particles of metal oxide curing agent, have been used to a considerable extent. However, these compositions must be mixed shortly before use, i.e. not more than about three or four hours, since they stiffen rapidly past the point where they can readily be applied. Thorough mixing of the relatively small amount of a paste of fine solid particles of a curing agent such as lead dioxide with the highly viscous polysulfide base is essential but is difficult with the equipment ordinarily available at the point of application.

It is an object of the present invention to provide a curable sealant composition which is easier to prepare and which has a longer application time or pot life.

To this end, and in accordance with a feature of the present invention, there is provided a curable sealant composition which is spreadable but substantially non-sagging from a mixture of liquids. These liquids are easily and completely combined by a simple stirring action and the mixture thickens to the necessary consistency for application within a short time. After initial thickening to the non-sagging condition, the material remains at workable consistency for application for a greater period of time, which may be from 12 to 24 hours, than is ordinarily available with previously known compounds.

The known cured polysulfide sealant is weather resistant, but its low tensile strength and poor adhesion to some materials have on occasion resulted in mechanical rupture of the seal. It is attacked by mercaptans in fuel and swells in aromatic solvents. Also, its discoloration from alkalinity in mortar of brick walls or in concrete interferes with its utility in such relations.

It is a further object of the invention to provide a sealant having higher tensile strength and adhesion characteristics coupled with controllable flexibility and resilience in cured condition which enable joints made with the sealant to resist stresses encountered.

To this end, and in accordance with another feature of the invention, I have provided a curable sealant composition which is resistant to mercaptans and aromatic solvents and does not discolor in contact with alkaline material. The composition includes resinous components combined in a novel relation giving improved adhesion to a wide variety of surfaces. In this composition the development of stiffness may be controlled to an extent which allows resilient deformation of the cured material which reduces the localization of stresses which might otherwise tend to rupture the material.

In accordance with the present invention, a non-discoloring sealant composition of pasty consistency is formed by mixing the liquid reaction product of an organic compound containing a plurality of active hydrogens and a substantial excess of polyisocyanate over the amount theoreticallly required for reaction with the hydrogens, with a liquid polyepoxide and a selected aromatic amine cross linker or catalyst. It has been found that after mixing these components and holding at room temperature for a relatively short time, for example about 30 minutes, the mixture thickens to a pasty condition. In thickened condition, the material is sufficiently flowable to be applied by a caulking gun or putty knife and forced into full sealing engagement even in relatively fine cracks. Surprisingly, the consistency does not greatly increase thereafter for a substantial period, so that material prepared on one day may be used on the following day. It is a further advantage of the mixture in its thickened condition that although readily applied it does not tend to run or sag even when filled into vertical or overhead joints. A further important characteristic is the extremely good adhesion to metal and other surfaces which is due in some measure to the presence of the epoxy resin. The material shows substantially no shrinkage in curing.

The cross linked product is resistant to water, aliphatic and aromatic hydrocarbons and mercaptans (as found in jet fuels) and is not visibly affected by ultraviolet light. Also the product has good electrical properties. These important properties, coupled with its relatively low specific gravity, strength and resistance to abrasion and high temperatures, are extremely valuable particularly in aircraft.

The light, almost neutral color of the product and its resistance to decomposition by ultraviolet light enable the preparation of almost any color. Also the product is nearly odorless and needs no solvent so that it is capable of a variety of special uses for which presently known compounds are barred.

The composition may also be formed into strips of various cross sections, e.g. channel or flat, and cured to provide resilient, shape-retaining, weather resistant, solvent resistant sealing members.

The components of the curable sealant composition of the present invention, including the reaction product of the organic compound containing a plurality of active hydrogens and polyisocyanate and the liquid polyepoxide and amine cross linker or catalyst, may be combined into a single product useful for sealant purposes. The sealant composition is compounded to contain about 50% or more by weight of the reaction product based on the weight of the reactive components of the entire composition. The remainder of the composition comprises compounds containing active hydrogen in quantity substantially equivalent to the quantity of available —NCO groups in the reaction product. The compounds containing active hydrogen include the amine cross linker or catalyst, and ordinarily additional such compounds, e.g. polyester glycols or polyether glycols.

The components may be divided into two parts each of which is a stable liquid and these liquid parts are readily mixed to form the pasty sealant when needed. In one of these parts, called the Part A, there will be included the reaction product of the diisocyanate and the active hydrogen-containing organic compound; while the other part, called the Part B, will contain the cross linker or catalyst. The remaining components may be incorporated in either the Part A or in the Part B; but the character of the cured sealant can be varied greatly as to stiffness or softness by mixing one or the other of the remaining components with the Part B or with the Part A.

Compositions having a relatively soft resilient nature in finally cured form are obtained where the polyepoxide material and additional organic compound having reactive hydrogens are in the Part B along with the catalyst or cross linker. Somewhat harder compositions are obtainable where the Part B contains the polyepoxide and the catalyst or cross linker but no additional organic compound having active hydrogens; and quite stiff cured products are obtained where the epoxide resin is included in the Part A along with the reaction product. This last class of material is particularly resistant to the action of jet fuel containing mercaptans and aromatic hydrocarbons.

The reaction product used in the Part A is prepared by mixing an organic compound containing a plurality of active hydrogens with from about 2 to about 4, preferably from 2.5 to 3, times the quantity of polyisocyanate theoretically required to react with the available hydrogens. The mixture is heated to from about 25° C. to about 85° C. for a period which may be about one hour to react the active hydrogens with —NCO groups from the polyisocyanate leaving a liquid product having a relatively high reactive —NCO content. In these proportions, the residual unreacted isocyanate groups give to the product desired stability on storage in the absence of moisture and relatively low viscosity.

The active hydrogen containing organic compounds for the above reaction are moderately high viscosity liquids which may be hydroxyl terminated polyester glycols or polyether glycols having molecular weights above about 2000. The polyester glycols are obtained by esterification and polymerization of saturated dibasic acids, such as adipic acid, suberic acid and the like and mixtures of these, with polyhydroxy compounds such as the glycols, e.g. propylene glycol and butylene glycol, mixtures of glycols, and for stiffer products mixtures of one or more glycols with small amounts of trivalent alcohols, e.g. trimethylolpropane or hexane triol. It is important that polyesters be chosen which have no, or at most only moderate, branching in order that the sealant composition may have the desired flexibility and resilience after curing. The useful polyester and polyether glycols will have hydroxyl numbers of from about 20 to about 65 and acid numbers not over about 1.5. Tolylene diisocyanate is a preferred polyisocyanate for reaction with the glycols but other liquid diisocyanates may be used.

The second part (Part B) of the sealant composition is a liquid comprising a relatively slow acting aromatic amine cross linker or catalyst reactive with —NCO groups to form cross links. The cross linker or catalyst will be present in amount to provide from about 3.5% to 9.0%, preferably about 7% by weight of the reactive components of the sealant when parts A and B are mixed. The cross linker or catalyst component is a slow acting aromatic diamine containing substantially no free hydroxyl groups. The preferred material is 4,4 methylene bis (2 chloro-aniline). Other, much less satisfactory materials, are diamino diphenylsulfone and the eutectic liquid mixture of cumene diamine and m-phenylene diamine. The preferred material, 4,4 methylene bis (2 chloro-aniline), is a solid and for purposes of easy and complete mixing with the Part A, is dissolved in the polyepoxide or in an organic compound having active hydrogens to form a liquid solution.

Solution of the cross linker or catalyst in the polyepoxide or in the organic compound having active hydrogens ordinarily involves melting it, if it is normally solid, stirring it into the polyepoxide or organic compound, and warming the mixture slightly to facilitate solution. Such mixtures remain liquid on cooling for long periods of time.

The proportions of the components in the second part are selected to give a viscosity suitable for easy mixing with the first part. Where the compound having active hydrogens is a polyester glycol, the second part will ordinarily contain from about 10% to about 20% and preferably from about 10% to about 15% of the aromatic amine cross linker or catalyst based on the total weight of the second part. Where the compound having active hydrogens is a polyether glycol the catalyst or cross linker will ordinarily be present to the extent of from about 10% to about 20%, preferably about 16% to about 20%, by weight based on the total weight of the second part.

The polyester glycol or polyether glycol, where this is included in the second part, will be present only in amount which, when the first and second part are mixed, will supply active hydrogen equal to, or preferably 0.1% in excess of that which, taken with the active hydrogen of the aromatic amine cross linker or catalyst, is theoretically required for reaction with available —NCO groups in the first part. Where polyester or polyether glycol is not included in the second part, the amount of aromatic amine cross linker or catalyst must be substantially sufficient to supply active hydrogen for reaction with available —NCO groups in the first part when the first and second parts are combined.

The polyepoxide is used in amount of from about 5% to about 12% by weight based on the weight of the entire composition. Polyepoxides for use in the present sealant are chosen from liquid low molecular weight aromatic polyepoxides such as the glycidyl polyethers of polyhydric phenols. The polyepoxides used are those having viscosities below 20,000 centipoises at 25° C., epoxide equivalents between 170 and 210, and hydroxyl values between 80 and 90.

The sealant will ordinarily include a substantial percentage of inert finely divided inorganic filler material, preferably silica. Plasticizers such as non-volatile ester type plasticizers such as tributyl phosphate and dibutyl phthalate to the extent of up to about 5% by weight based on the weight of the entire composition may also be incorporated, if desired. The quantity of inorganic filler incorporated may vary from about 4% to about 10% by weight based on the weight of the entire composition. Higher quantities of filler tend to decrease the resilience of the cured sealant and to reduce somewhat the adhesive character of the sealant.

It is believed that a factor affecting the softness or hardness of the cured sealant is the reaction of the polyepoxide with components of the uncured sealant prior to combination of the Part A and the Part B. That is, where the Part B comprises the polyepoxide in addition to the aromatic amine there are indications of partial reaction of the polyepoxide with the amine to form larger molecules. When the Part A and Part B are combined, the larger molecules of reacted polyepoxide react with and in effect graft onto the —NCO groups of the reaction product of the Part A to give elasticity to the resulting polymer.

Where the Part B contains a polyester or polyether glycol along with the polyepoxide and aromatic amine, the glycol serves as a diluent and plasticizer when the Part A and Part B are combined. The reaction between the Part A and Part B proceeds more slowly and the product is softer than in the first case.

Where the Part B comprises only polyester or polyether glycol in addition to the aromatic amine, no reaction occurs in the Part B. In this case the Part A will contain polyepoxide resin in addition to the reaction product of diisocyanate and polyester or polyether glycol. When the Part A is combined with the Part B, the aromatic amine reacts with the polyepoxide and the diisocyanate reaction product and also promotes the interaction of the polyester or polyether glycol with the isocyanate and effects a cross linking of the various products of reaction. The resultant product is harder than in either of the preceding cases.

As regards the action of the sealant composition in first thickening to a pasty consistency within a relatively short time after mixing, followed by ultimate curing to resilient condition, it is believed that the initial thickening is due to interaction of the amine with the diisocyanate reaction product to effect chain extension and/or limited cross linking. Further action is the relatively slow combination at room temperature of the polyester or polyether glycol and polyepoxide with the diisocyanate reaction product and further development of cross links by interaction of the hydroxyl groups of the polyester or polyether glycol with —NCO groups on the diisocyanate reaction product molecules. Because of the size of the polyester or polyether glycol molecules, this cross linking does not give a rigid product but one containing a substantial degree of resilience. Shore "A" Hardness values for these products will be under 50 and preferably between 20 and 40.

Heating of the reactive mixture to a temperature substantially above room temperature gives harder products than those obtained by room temperature reaction. It is believed that this is due to substantially increased relative rate and extent of cross linking at the higher temperature.

The above explanations of probable mechanism involved in the present sealant are advanced as of possible assistance in understanding the invention. However, patentability of the invention is not predicated on the correctness of the explanation since new, useful and unobvious results are obtained.

The following examples are given as of assistance in understanding the invention; but it is to be understood that the invention is not restricted to the materials, proportions and conditions employed in the examples:

Example I 81 parts by weight of a substantially unbranched adipic acid polyester glycol having a hydroxyl number of from 41–47, an acid number not over 1.5, a viscosity of 650 to 850 centipoises at 73° C. and an equivalent weight of 1300 were heated to 40° C. and 14 parts by weight of 2,4 tolylene diisocyanate were added in a small stream over a period of 10 minutes, the temperature being increased to 80° C. to 85° C. The mixture was kept at this temperature for 30 minutes. This reaction product was degassed. To the resultant reaction product there were added 4 parts by weight of finely divided silica and the product was degassed again. The resultant material was a viscous liquid at room temperature and constituted the Part A of the sealant composition. This mixture was kept cool and away from moisture.

56 parts by weight of polyester glycol as used in Part A and 16.5 parts by weight of a liquid diglycidyl ether of bis Phenol-A having an epoxide equivalent of 190, a hydroxyl number of about 85 and a viscosity at 25° C. of about 8,000 centipoises were warmed to 40° C. 13 parts by weight of 4,4' methylene bis(2 chloro-aniline) were melted and added to the ester glycol-epoxy solution with stirring to effect solution. Into the resulting liquid there were dispersed 4.5 parts by weight of finely divided silica. Finally, there were added 9.1 parts by weight of dibutyl phthalate. The mixture was degassed. The resultant material was a smooth, relatively viscous liquid at room temperature constituting the Part B of the sealant composition. It was kept cool before use. The Part B was substantially neutral in color and could be given any desired color, light or dark, by addition of carbon black, pigments or dyes.

10 parts by weight of the reacted polyester glycol (Part A) were combined with 7 parts by weight of the solution (forming Part B). Within ½ hr. the mixture had thickened to the condition of a translucent paste which would not flow, sag or run under gravity.

This translucent paste was applied to joints between glass and an aluminum frame using a caulking gun. The material was allowed to cure for 10 days at the end of which time the applied material was found strongly adhesive to both the glass and the aluminum. The material was in a moderately soft, rubbery, resilient condition and showed nearly 100% recovery after an elastic stretch of 150%.

A portion of the mixture of parts A and B was held overnight and found to be in a workable condition on the following day with only limited increase in viscosity. A portion of this material was applied to a 1" wide crack in a brick and mortar wall. The applied material did not flow or sag. After 7 days the material was found to have cured to a moderately soft, rubbery, resilient condition firmly adherent to the surfaces of glass, aluminum, steel, wood, concrete, or of brick and mortar. The material did not discolor even in those portions adjacent the mortar.

Further portions of the mixed Part A and B were applied to an aluminum surface and allowed to cure for 14 days. The tensile strength was 120 p.s.i. with 150% elongation without break. Thereafter the applied material was subjected to water and ultraviolet radiation in a "Weatherometer" for a period of 90 days. On completion of the test it was found that the material retained its soft, rubbery, resilient condition, that the surface was slightly discolored but otherwise unaffected and that the material was still strongly adherent to the aluminum.

Example II 400 parts by weight of an only slightly branched adipic acid polyester glycol having a hydroxyl number of from 57 to 63, an acid number not over 1.5, a viscosity of from 1,000 to 1,100 cps. at 73° C., and an equivalent weight of 920 were heated to 50° C., and 149 parts by weight of tolylene diisocyanate were added in a small stream over a period of 15 minues, the temperature being maintained at 85° C. for 30 minutes. The reaction product was degassed, and then kept cool until use as Part A of a sealant.

400 parts by weight of a liquid diglycidyl ether of bis Phenol-A having an epoxide equivalent of 190, a hydroxyl number of about 85 and a viscosity at 25° C. of about 8,000 cps. were heated to 80° C. 60 parts by weight of 4,4' methylene bis(2 chloro-aniline) were melted and added to the heated glycidyl polyether with stirring to effect solution. The mixture was degassed, cooled to room temperature, and kept cool until use. The mixture was a smooth, relatively viscous liquid constituting the Part B of the sealant composition.

10 parts of the reacted polyester glycol Part A were combined with 8 parts by weight of the liquid forming Part B at room temperature. The temperature of the mixture rose about 9° (which indicated that an exothermic reaction was occurring). Within ½ hr. the mixture had thickened to the condition of a translucent paste which would not flow, sag or run under gravity.

The translucent paste was applied to fill an aluminum channel in which the edge of a glass sheet was retained. The material was allowed to cure for 7 days at the end of which time the applied material was found strongly adhesive to both the glass and aluminum. The material was in a somewhat hard but resilient condition.

Example III 200 parts by weight of polypropylene glycol having a molecular weight of about 3,000, a hydroxyl number of 35 and a viscosity of 351 centistokes at 100° F., and 32.6 parts by weight of tolylene diisocyanate were added dropwise over a period of 5 minutes, the temperature being raised to 120° C. in 12 minutes and kept at 120° C. for 18 minutes. The reaction product was degassed. 150 parts by weight of the reaction product were combined with 30 parts of finely divided silica and again degassed. The resultant material was a viscous liquid at room temperature and constituted the Part A of a sealant composition. The mixture was kept cool until use as Part A of a sealant.

140 parts of the same polypropylene glycol and 40 parts by weight of a liquid diglycidyl ether of bis Phenol-A having an epoxide equivalent of 190, a hydroxyl number of about 85 and a viscosity at 25° C. of about 8,000 cps. were heated to 80° C. 20 parts by weight of 4,4' methylene bis(2 chloro-aniline) were melted and added to the warm material with stirring to effect solution. Thereafter, 40 parts of finely divided silica were added and the mixture was degassed. The mixture was cooled to room temperature and was a smooth, relatively viscous liquid constituting the Part B of a sealant composition.

50 parts by weight of the reacted polypropylene glycol Part A were combined with 35 parts by weight of the solution forming Part B. The temperature of the mixture rose about 6° C. which indicated that an exothermic reaction was occurring. Within about 30 minutes the mixture had thickened to the condition of a translucent paste which would not flow, sag or run under gravity.

The translucent paste was applied to the joints between glass and an aluminum frame using a caulking gun. The material was allowed to cure for 7 days at the end of which time the applied material was in a moderately soft, rubbery, resilient condition strongly adhesive to both the glass and aluminum.

*Example IV*

74 parts by weight of a substantially unbranched adipic acid polyester glycol having a hydroxyl number of from 41 to 47, an acid number not over 1.5, a viscosity of 650 to 850 cps. at 73° C. and an equivalent weight of about 1,300 were heated to 40° C. and 10 parts by weight of tolylene diisocyanate were added in a small stream with stirring. The solution was heated to 85° C. in 15 minutes and was maintained at 85° C. for 30 minutes. The solution was cooled to 60° C. and 7.0 parts of a liquid diglycidyl ether of bis Phenol-A having an epoxide equivalent of 190, a hydroxyl number of about 85 and a viscosity at 25° C. of about 8,000 cps. were added. The mixture was degassed and 9 parts of finely divided silica added and thoroughly dispersed therein. The mixture was degassed again, poured into containers and maintained dry and cool until use as Part A of a sealant.

67 parts by weight of the same polyester glycol were warmed to 50° C. and 28 parts of melted 4,4' methylene bis (2 chloro-aniline) were stirred in to effect solution. 4.5 parts by weight of finely divided silica and 0.5 part by weight of carbon black were stirred in and the product was degassed. The product was stored in dry, cool condition until use as Part B of a sealant.

10 parts by weight of the diisocyanate reaction product (Part A) were combined with 2 parts by weight of the solution (Part B) and mixed thoroughly. The mixture after 30 minutes was a smooth paste having a consistency spreadable with a caulking gun. Using a caulking gun the material was applied as fillets and faying compound in an aircraft fuel tank. After 7 days the material had cured to a resilient condition firmly adherent to the tank walls.

A further portion of the composition was applied to an aluminum surface and allowed to cure for 10 days. Thereafter the applied mixture and the aluminum surface were immersed in jet fuel containing mercaptans for a period of 7 days at 120° F. At the end of this time it was found that less than 1% of swelling occurred.

*Example V*

85 parts by weight of an only slightly branched adipic acid polyester glycol having a hydroxyl number of from 41 to 47, an acid number not over 1.5, a viscosity of from 650 to 850 cps. at 73° C. and an equivalent weight of 1300 were heated to 50° C. Thereafter 10 parts of tolylene diisocyanate were added to the polyester glycol in a small stream and the temperature of the mixture raised to 85° and kept for 30 minutes at that temperature. 5 parts of finely divided silica were thoroughly mixed in and the mixture was degassed and cooled. The product was stored in cool and dry condition until use as Part A of a sealant.

58 parts by weight of the same polyester glycol were combined with 18 parts by weight of a liquid polyglycidyl ether of bis Phenol-A having an epoxide equivalent of 190, a hydroxyl number of about 85 and a viscosity of 25° C. of about 8,000 cps. The mixture was warmed to 50° C. and 12.5 parts of 4,4' methylene bis(2 chloroaniline) were added in molten condition to form a solution. 4.4 parts by weight of titanium dioxide, 0.1 part by weight of carbon black and 7 parts by weight of finely divided silica were added and thoroughly stirred in. The resultant viscous liquid was degassed and cooled. The resultant material was stored in cool condition away from moisture until use as Part B of a sealant.

100 parts by weight of the reaction product (Part A) were mixed with 40 parts by weight of the solution (Part B) and allowed to stand for a few hours. At the end of this time the product was in pasty condition having a consistency capable of application by caulking gun or putty knife. The material was applied to fill cracks in wood and metal marine structures beneath the surface of the water. The material set under water to an elastic seal strongly adherent to the wood and metal surfaces.

*Example VI*

81 parts by weight of a substantially unbranched adipic acid polyester glycol having a hydroxyl number of from 41–47, an acid number not over 1.5, a viscosity of 650 to 850 centipoises at 73° C. and an equivalent weight of 1300 were heated to 40° C. and 11 parts by weight of 2,4 tolylene diisocyanate were added in a small stream over a period of 10 minutes, the temperature being increased to 80° C. to 85° C. The mixture was kept at this temperature for 30 minutes. This reaction product was degassed. To the resultant reaction product there were added 8 parts by weight of finely divided silica and the product was degassed again. The resultant material was a viscous liquid at room temperature and constituted the Part A of the sealant composition. The mixture was kept cool and away from moisture.

To 40 parts by weight of a liquid diglycidyl ether of bis Phenol-A having an epoxide equivalent of 190, a hydroxyl number of about 85 and a viscosity at 25° C. of about 8,000 cps., there were added 5 parts of diamino diphenylsulphone. The materials were stirred together until a clear solution was obtained. To the mixture there were added 5 parts of finely divided silica and the mixture was degassed and stored until use as Part B of the sealant composition.

10 parts by weight of the reacted polyester glycol Part A were combined with 2 parts by weight of the liquid forming Part B at room temperature. The temperature rose slightly which indicated that an exothermic reaction was occurring. Within ½ hr. the mixture had thickened to the condition of a translucent paste which would not flow, sag or run under gravity.

The paste was applied to fill an aluminum channel in which the edge of a glass sheet was retained. After curing for 7 days, the applied material was found strongly adhesive to both the glass and aluminum. The cured material had a Shore A hardness of 20.

*Example VII*

81 parts by weight of a substantially unbranched adipic acid polyester glycol having a hydroxyl number of from 41–47, an acid number not over 1.5, a viscosity of 650 to 850 centipoises at 73° C. and an equivalent weight of 1300 were heated to 40° C. and 14 parts by weight of 2,4 tolylene diisocyanate were added in a small stream over a period of 10 minutes, the temperature being increased to 80° C.–85° C. The mixture was kept at this temperature for 30 minutes. This reaction product was degassed.

To the resultant reaction product there were added 5 parts by weight of finely divided silica and the product was degassed again. The resultant material was a viscous liquid at room temperature and constituted the Part A of the sealant composition. The mixture was kept cool and away from moisture.

70 parts of the same polyester glycol as used in the Part A were combined with 20.6 parts of a liquid diglycidyl ether of bis Phenol-A having an epoxide equivalent of 190, a hydroxyl number of about 85 and a viscosity at 25° C. of about 8,000 cps. To the resulting solution there were stirred in 5.6 parts of finely divided silica. 3.8 parts by weight of a liquid eutectic mixture of cumene diamine and m-phenylene diamine were added. The mixture was degassed and stored until use as the Part B of the sealant composition.

10 parts by weight of the Part A were combined with 6.25 parts by weight of the Part B. The mixture was stirred to effect uniform distribution of all the components and allowed to stand at room temperature. Within less than ½ hr., the mixture had thickened to a paste which would not flow, sag or run under gravity.

The paste was applied to fill an aluminum channel in which the edge of a glass sheet was retained. After 7 days curing the applied material was found strongly adhesive to both the glass and aluminum.

Having thus described my invention, what I claim as new and desire to secure by Letters Patent of the United States is:

1. A pasty sealant composition curable at room temperature to resilient condition consisting essentially of the combination of (A) the liquid reaction product of (I) a member of the class consisting of (a) poly(alkylene ether) glycols having a molecular weight above about 2000 and a hydroxyl number of from about 20 to 65 and (b) alcoholic hydroxyl terminated polyesters having molecular weights above about 2000 and hydroxyl numbers of from about 20 to 65, said polyesters being condensates of (i) saturated dicarboxylic acids and (ii) alcohols selected from the class consisting of dihydric alcohols and mixtures thereof with small amounts of trihydric alcohols, with (II) from about 1.5 to about 5 times the amount of aromatic diisocyanate required to provide one —NCO group for reaction with each hydrogen of the alcoholic hydroxyl groups of said member, (B) a liquid low molecular weight diglycidyl ether of a polyhydric phenol having a vic-epoxy equivalent of between 170 and 210, an OH value of from 80 to 90 and a viscosity not over about 20,000 cps. at 25° C., (C) an amine from the group consisting of 4,4' methylene bis (2 chloro-aniline), diamino diphenyl sulfone, and a liquid eutectic mixture of cumene diamine and m-phenylene diamine and triethanol amine and (D) a member of said class consisting of (a) poly(alkylene ether) glycols and (b) alcoholic hydroxyl terminated polyesters,
said sealant comprising, based on the sum of the weights of the components (A), (B), (C) and (D) at least 50% by weight of said liquid reaction product (A), from about 5% to about 12% by weight of said diglycidyl ether (B), from 3.5% to 9% by weight of said amine (C), and an amount of said member (D) of said class consisting of (a) poly(alkylene ether) glycols and (b) alcoholic hydroxyl terminated polyesters, sufficient to provide an amount of alcoholic hydroxyl groups supplying active hydrogen which taken with the active hydrogen of the amino groups of said amine (C) is about equal to the available —NCO groups in said reaction product (A).

2. A pasty sealant composition curable at room temperature to resilient condition consisting essentially of the combination of
(A) the liquid reaction product of (I) a member of the class consisting of (a) poly(alkylene ether) glycols having a molecular weight above about 2000 and a hydroxyl number of from about 20 to 65 and (b) alcoholic hydroxyl terminated polyesters having molecular weights above about 2000 and hydroxyl numbers of from about 20 to 65, said polyesters being condensates of (i) a saturated dicarboxylic acid and (ii) alcohol selected from the class consisting of dihydric alcohols and mixtures thereof with small amounts of trihydric alcohols, with (II) from about 1.5 to about 5 times the amount of tolylene diisocyanate required to provide one —NCO group for reaction with each hydrogen of the alcoholic hydroxyl groups of said member, (B) a liquid low molecular weight diglycidyl ether of a polyhydric phenol having a vic-epoxy equivalent of between 170 and 210, an OH value of from 80 to 90 and a viscosity not over about 20,000 cps. at 25° C., (C) 4,4' methylene bis (2 chloro-aniline) dissolved in (D) a member of said class consisting of (a) poly(alkylene ether) glycols and (b) alcoholic hydroxyl terminated polyesters,
said sealant comprising, based on the sum of the weights of the components (A), (B), (C), and (D) (2) at least 50% by weight of said liquid reaction product (A), from about 5% to about 12% by weight of said diglycidyl ether (B), from 3.5% to 9% by weight of 4,4' methylene bis (2 chloro-aniline) (C), and an amount of said member (D) of said class consisting of (a) poly(alkylene ether) glycols and (b) alcoholic hydroxyl terminated polyesters sufficient to provide an amount of alcoholic hydroxyl groups supplying active hydrogen which, taken with the active hydrogen of the amino groups of (C) 4,4' methylene bis (2 chloro-aniline), is about equal to the available —NCO groups in said reaction product (A), said composition containing from about 4% to about 10% by weight of inert finely divided mineral filler based on the weight of the entire composition.

3. A pasty sealant composition curable at room temperature to resilient condition consisting essentially of the combination of
(1) a liquid solution of (A) the liquid reaction product of (I) a member of the class consisting of (a) poly(alkylene ether) glycols having a molecular weight above about 2000 and a hydroxyl number of from about 20 to 65 and (b) alcoholic hydroxyl terminated polyesters having molecular weights above about 2000 and hydroxyl numbers of from about 20 to 65, said polyesters being condensates of (i) a saturated dicarboxylic acid and (ii) alcohol selected from the class consisting of dihydric alcohols and mixtures thereof with small amounts of trihydric alcohols, with (II) from about 1.5 to about 5 times the amount of an aromatic diisocyanate required to provide one —NCO group for reaction with each hydrogen of the alcoholic hydroxyl groups of said member (I) with
(2) a liquid solution of (B) a liquid low molecular weight diglycidyl ether of a polyhydric phenol having a vic-epoxy equivalent of between 170 and 210, an OH value of from 80 to 90 and a viscosity not over about 20,000 cps. at 25° C., (C) an amine from the group consisting of 4,4' methylene bis (2 chloro-aniline), diamino diphenyl sulfone, and a liquid eutectic mixture of cumene diamine and m-phenylene diamine and triethanol amine, and (D) a member of said class consisting of (a) poly(alkylene ether) glycols and (b) alcoholic hydroxyl terminated polyesters, said sealant comprising based on the sum of the weights of components of (1) and (2), at least 50% by weight of said liquid reaction product (A), from about 5% to about 12% by weight of said diglycidyl ether (B), from 3.5% to 9% by weight of said amine (C) and an amount of said member (D) of said class consisting of (a) poly(alkylene ether) glycols and (b) alcoholic hydroxyl terminated polyesters sufficient to provide an amount of alcoholic hydroxyl groups supplying active hydrogen which taken with the active hydrogen of the amino groups of said amine (C) is about equal to the available —NCO groups in said reaction product (A), said composition containing from about 4% to about 10% by weight of inert finely divided mineral filler based on the weight of the entire composition.

4. A pasty sealant composition curable at room temperature to resilient condition consisting essentially of the combination of
 (1) a liquid solution of (A) the liquid reaction product of (I) a member of the class consisting of (a) poly(alkylene ether) glycols having a molecular weight above about 2000 and a hydroxyl number of from about 20 to 65 and (b) alcoholic hydroxyl terminated polyesters having molecular weights above about 2000 and hydroxyl numbers of from about 20 to 65, said polyesters being condensates of (i) saturated dicarboxylic acids and (ii) alcohols selected from the class consisting of dihydric alcohols and mixtures thereof with small amounts of trihydric alcohols, with (II) from about 1.5 to about 5 times the amount of an aromatic diisocyanate required to provide one —NCO group for reaction with each hydrogen of the alcoholic hydroxyl groups of said member, with
 (2), (B) a liquid low molecular weight diglycidyl ether of a polyhydric phenol having a vic-epoxy equivalent of between 170 and 210, an OH value of from 80 to 90 and a viscosity not over about 20,000 cps. at 25° C., (C) an amine from the class consisting of 4,4' methylene bis (2 chloro-aniline), diamino diphenyl sulfone and a liquid eutectic mixture of cumene diamine and m-phenylene diamine and triethanol amine dissolved in (D) a member of said class consisting of poly(alkylene ether) glycols and alcoholic hydroxyl terminated polyesters,
 said sealant comprising, based on the sum of the weights of the components of (1) and (2), at least 50% by weight of said liquid reaction product (A), from about 5% to about 12% by weight of said diglycidyl ether (B), from 3.5% to 9% by weight of said amine (C), and an amount in (2) of said member (D) of said class consisting of (a) poly(alkylene ether) glycols and (b) alcoholic hydroxyl terminated polyesters sufficient to provide an amount of alcoholic hydroxyl groups supplying active hydrogen which taken with the active hydrogen of the amino groups of said amine (C) is about equal to the available —NCO groups in said reaction product (A).

5. A pasty sealant composition curable at room temperature to resilient condition consisting essentially of the combination of
 (1), (A) the liquid reaction product of (I) a poly(alkylene ether) glycol having a molecular weight above about 20,000 and a hydroxyl number of from about 20 to 65 with (II) from 1.5 to about 5 times the amount of tolylene diisocyanate required to provide one —NCO group for reaction with each hydrogen of the alcoholic hydroxyl groups of said poly(alkylene ether) glycol, with
 (2) (B) a liquid low molecular weight diglycidyl ether of a polyhydric phenol having a vic-epoxy equivalent of between 170 and 210, an OH value of from 80 to 90 and a viscosity not over about 20,000 cps. at 25° C., (C) 4,4' methylene bis (2 chloro-aniline) dissolved in (D) a poly(alkylene ether) glycol having a molecular weight above about 2000 and a hydroxyl number of from about 20 to 65,
 said sealant comprising, based on the sum of the weights of the components of (1) and (2), at least 50% by weight of said liquid reaction product (A), from about 5% to about 12% by weight of said diglycidyl ether (B), from 3.5% to 9% by weight of 4,4' methylene bis (2 chloro-aniline) (C) and an amount in (2) of a poly(alkylene ether) glycol (D) having a molecular weight about about 2000 and a hydroxyl number of from about 20 to 65, sufficient to provide an amount of alcoholic hydroxyl groups supplying active hydrogen which taken with the active hydrogen of the amino groups of 4,4' methylene bis (2 chloroaniline) (C) is about equal to the available —NCO groups in said reaction product (A), said composition containing from about 4% to about 10% by weight of inert finely divided mineral filler based on the weight of the entire composition.

6. A pasty sealant composition curable at room temperature to resilient condition consisting essentially of the combination of
 (1) (A) the liquid reaction product of (I) an alcoholic hydroxyl terminated polyester having a molecular weight above about 2000 and hydroxyl number of from about 20 to 65, said polyester being a condensate of (i) a saturated dicarboxylic acid and (ii) alcohol selected from the class consisting of dihydric alcohols and mixtures thereof with small amounts of trihydric alcohols with (II) from about 1.5 to about 5 times the amount of tolylene diisocyanate required to provide one —NCO group for reaction with each hydrogen of the alcoholic hydroxyl groups of said alcoholic hydroxyl terminated polyester, with
 (2) (B) a liquid low molecular weight diglycidyl ether of a polyhydric phenol having a vic-epoxy equivalent of between 170 and 210, an OH value of from 80 to 90 and a viscosity not over about 20,000 cps. at 25° C., (C) 4,4' methylene bis (2 chloro-aniline), dissolved in (D) an alcoholic hydroxyl terminated polyester having a molecular weight above about 2000 and hydroxyl number of from about 20 to 65, said polyester being a condensate of (i) a saturated dicarboxylic acid and (ii) alcohol selected from the class consisting of dihydric alcohols and mixtures thereof with small amounts of trihydric alcohol,
 said sealant comprising, based on the sum of the weights of the components of (1) and (2) at least 50% by weight of said liquid reaction product (A), from about 5% to about 12% by weight of said diglycidyl ether (B), from 3.5% to 9% by weight of said 4,4' methylene bis (2 chloro-aniline) and an amount of said alcoholic hydroxyl terminated polyester (D), sufficient to provide an amount of alcoholic hydroxyl groups supplying active hydrogen which taken with the active hydrogen of the amino groups of said 4,4' methylene bis (2 chloro-aniline) (C) is about equal to the available —NCO groups in said reaction product (A), said composition containing from about 4% to about 10% by weight of inert finely divided mineral filler based on the weight of the entire composition.

References Cited in the file of this patent
UNITED STATES PATENTS

| 2,799,663 | Hampton et al. | July 16, 1957 |
| 2,801,229 | De Hoff et al. | July 30, 1957 |
| 2,830,038 | Pattison | Apr. 8, 1958 |
| 2,965,930 | Nelson | Dec. 27, 1960 |
| 3,012,984 | Hudson | Dec. 12, 1961 |

OTHER REFERENCES

Lee et al.: "Epoxy Resins," Chapts. 6, 7, pp. 159–160 especially relied on. McGraw-Hill Book Co., N.Y., 1957.